United States Patent [19]

Barabas et al.

[11] B 3,923,714

[45] Dec. 2, 1975

[54] GRAFT COPOLYMERS OF POLY (N-VINYL LACTAM) HAVING DIACETONE ACRYLAMIDE AND ACRYLIC ACID ESTERS GRAFTED THEREON

[75] Inventors: Eugene S. Barabas, Watchung; Marvin M. Fein, Westfield, both of N.J.

[73] Assignee: GAF Corporation, New York, N.Y.

[22] Filed: Dec. 6, 1972

[21] Appl. No.: 312,477

[44] Published under the Trial Voluntary Protest Program on January 28, 1975 as document no. B 312,477.

[52] U.S. Cl. . 260/29.6 WB; 260/836; 260/857 UN; 260/857 G; 260/885; 260/895
[51] Int. Cl.[2] .................. C08L 35/00; C08L 39/04
[58] Field of Search............ 260/885, 895, 29.6 HN, 260/29.6 CM, 29.6 PM, 836, 88.3 L, 857 UN, 857 G

[56] References Cited
UNITED STATES PATENTS

| | | | |
|---|---|---|---|
| 3,097,185 | 7/1963 | Armen et al. | 260/876 R |
| 3,277,056 | 10/1966 | Coleman | 260/63 |
| 3,536,650 | 10/1970 | Jasinski et al. | 260/885 |
| 3,558,742 | 1/1971 | Schmid et al. | 260/836 R |

*Primary Examiner*—Murray Tillman
*Assistant Examiner*—J. Ziegler
*Attorney, Agent, or Firm*—Walter C. Kehm; James M. Blauvett

[57] ABSTRACT

There is disclosed a graft copolymer of a monomer mixture comprising diacetoneacrylamide and an ester of acrylic or methacrylic acid graft polymerized on a polymeric N-vinyl lactam as substrate, a stable aqueous emulsion containing same and method of producing same.

11 Claims, No Drawings

GRAFT COPOLYMERS OF POLY (N-VINYL LACTAM) HAVING DIACETONE ACRYLAMIDE AND ACRYLIC ACID ESTERS GRAFTED THEREON

BACKGROUND OF THE INVENTION

This invention relates to novel graft copolymers of N-vinyl lactams with diacetoneacrylamide with the optional addition of a second and different acrylate monomer and a process for their production and more particularly to a stable aqueous emulsion containing such graft copolymers and to the process of producing such emulsions.

It is well known that many N-vinyl lactams can be interpolymerized with other vinyl polymers. However, it has not been possible to produce interpolymers of N-vinyl lactams with diacetoneacrylamide grafted thereon or interpolymers of N-vinyl lactams having grafted thereon diacetoneacrylamide and a second acrylate monomer. Techniques which have been used to form copolymers of diacetoneacrylamide or acrylates or interpolymers of these monomers have not worked well with N-vinyl lactams.

Attempts to prepare an N-vinyl lactam-diacetoneacrylamideacrylate graft copolymer by ordinary techniques leads to the formation of a polymer containing very little of the N-vinyl lactam. Apparently the N-vinyl lactam will not enter the polymer chain to any appreciable extent using ordinary copolymerization techniques.

It is now been found that N-vinyl lactam - diacetoneacrylamide-acrylate-graft copolymers can be formed by using a new and novel technique, which surprisingly gives extremely stable emulsions, if so desired.

The novel graft copolymers of this invention can be compounded with a wide variety of additives such as pigments, clays, salts, protective colloids, wetting agents, plasticizers, resins, waxes, etc., in order to obtain a wider range of products for use in all fields in which emulsion polymers are now used.

In the graft copolymers of this invention, the units of N-vinyl lactam form the substrate, while the side chain contains the units of the diacetoneacrylamide and the optional acrylate grafted thereon.

The composition of the graft copolymer can be varied over a wide range by using the N-vinyl lactam and the comonomers in different ratios, using different acrylic ester comonomers; using a combination of different esters of acrylic acids, again in different ratios, varying the ratio of acrylic acid esters and diacetoneacrylamide; and using more than one functional monomer. In this way, latices with a broad spectrum of properties may be made.

In one embodiment of the invention where only the diacetoneacrylamide is grafted onto the N-vinyl lactam backbone there is obtained polymers with novel and unique properties, such as ultra violet stability; high polarity; hydrophobicity; high gas permeability; and the ability to cross link. The carbonyl group of of the graft copolymer containing only the diacetoneacrylamide may be subjected to chemical reactions typical to the keto-group yielding a variety of products. The polymers may also be crosslinked through their functional group by difunctional compounds (such as diamines, glycols, amino alcohols, etc.) or by reaction with chromium trioxide or aluminum isopropoxide. By such treatment, polymers of increased solvent resistance and durability may be prepared. The new graft copolymers described hereinabove composed of the two component system offer relatively inexpensive products of great versatility. Copolymers of diacetoneacrylamide are known to have excellent film forming properties and high ultraviolet stability. The monomer of diacetoneacrylamide grafted onto poly (N-vinyl lactam) also enhances the adhesive properties and gas permeability of the resultant polymer. The copolymer can be used in a variety of applications, such as adhesives and binders, textile and paper treating agents, printable coatings, interfaces, rubber impregnants, paint bases and the like.

In another embodiment of the instant invention, that is, where the second acrylate is also grafted on as a side chain unit, the units containing the carbonyl and amide groups represent functionalities through which the graft copolymers may be subjected to various chemical reactions, yielding a variety of products. As aforesaid, the resultant terpolymer may also be cross-linked through the functional group by the aforesaid bifunctional compounds, by heat treatment or by other ways known in the art. By such treatment, film, filaments and other objects of increased solvent resistance may be prepared. As is known, acrylate type latices are widely used in textile finishes, paint bases, polishing formulations and the like. The functional group makes the polymer cross linkable which improves several physical properties thereof, such as durability, solvent resistance, rub resistance and the like. Due to the hydrogen bonding character of the bonded groups, as well as the high reactivity of the keto and epoxy groups, the terpolymers of this invention are also eminently suitable for chemical reactions and cross linking, e.g., with the aforesaid glycols, diamines, alcoholic amines, diacids, etc.

N-vinyl lactams and water soluble polymers thereof, and methods for their production are well known in the art. Thus, for example, U.S. Pat. No. 2,317,804 discloses a suitable method for preparing N-vinyl lactams and U.S. Pat. Nos. 2,215,450 and 2,335,454 disclose methods for preparing water soluble polymers thereof and aqueous solutions containing the same. As examples of N-vinyl lactams which may be employed in producing in known manner the operative aqueous solutions of water soluble polymers thereof, there may be mentioned the N-vinyl derivatives of gamma-, delta-, and epsilon-lactams (N-vinyl derivatives of the cyclic amides of gamma-, delta-, and epsilon-lactams (N-vinyl derivatives of the cyclic amides of gamma-, delta-, and epsilon-aminocarboxylic acids of the aliphatic series) and lower alkyl (methyl, ethyl) substituted derivatives of such N-vinyl lactams. Among this group, N-vinyl-2-pyrrolidone (otherwise referred to as 1-vinyl-2-pyrrolidone, N-vinyl-α-pyrrolidone) is preferred. As illustrative of other N-vinyl lactams within this group there may be mentioned N-vinyl-2-piperidone, N-vinyl-6-caprolactam, N-vinyl-5-methyl-2-pyrrolidone, N-vinyl-3,3-dimethyl-2-pyrrolidone, and the like. Other N-vinyl lactams which may be employed include N-vinyl-hexahydrophthalamidine, N-vinyl naphthostyrile, etc. Depending upon the extent of polymerization, these polymeric N-vinyl lactams may have molecular weights ranging from at least 400 up to 2,000,000 or more. The Fikentscher K value as described, for example, in Schildknecht, Vinyl and Related Polymers, John Wiley & Sons, Inc., New York, 1952 (page 676), is a convenient designation of relative degree of polymerization or relative molecular weight. Generally, there may be employed those polymeric N-vinyl lactams having a K value of about 10 to 200 and preferably about 20 to 60, and mixtures thereof.

The acrylic ester monomer (or mixture thereof) employed herein may be any ester of acrylic, ethacrylic, α-ethacrylic, or α-chloracrylic acid with a monohydroxylic organic compound referred to herein as a monohydric alcohol, which may be saturated or unsaturated, aromatic or aliphatic, straight or branched chain, substituted or unsubstituted. As examples of suitable monohydroxylic organic compounds which may be employed for esterifying one of the above mentioned acrylic acids, there may be mentioned such alcohols, such as methyl, ethyl, propyl, butyl, isobutyl, 2-ethyl hexyl, amyl, hexyl, cyclohexyl, heptyl, dodecyl, octyl, oxo tridecyl, tetradecyl, pentadecyl, hexadecyl, octadecyl, oleyl, arachidyl, ceryl, dimethylaminoethyl, tertiary-butylaminoethyl, and benzyl alcohol in addition to phenol, naphthol and the like. These esters are substantially water insoluble.

The free radical-supplying polymerization catalysts useful in the present process are well known in the art. Most of these catalysts are compounds yielding oxygen under the conditions of polymerization as represented by the inorganic and organic peroxygen or peroxide compounds. As examples of such compounds, there may be mentioned hydrogen peroxide, metal and alkali metal peroxides, such as, sodium potassium, barium and zinc peroxide, diacyl peroxides, such as diacetyl, dibenzoyl and dilauroyl peroxide, dialkyl peroxides, such as, di-tertiary-butyl peroxide and cyclohexene peroxide, hydroperoxides, such as, tertiary-butyl hydroperoxide and p-methane hydroperoxide, peroxygen acids, such as, perfomic, persulfuric and peracetic acid and their ammonium, sodium and potassium salts, in addition to systems, such as, potassium or ammonium persulfate-sodium bisulfite. Other oxygen-yielding compounds or sources include atmospheric oxygen, ozone and the like.

Azo type catalysts, i.e., compounds containing the azo linkage, may also be employed. As example of such catalysts there may be mentioned α,α'-azobis-(αγ-dimethylvaleronitrile), α,α'-azobis-(α-methyl butyronitrile), α,α'-azobis-(α-ethyl butyronitrile), α,α'-azodiisobutyramide, dimethyl and diethyl, α,α'-azodiisobutyrate, and the like.

The preferred catalysts effective for the production of optimum results with respect to a minimum of homopolymer and maximum emulsion stability and film clarity are the organic and inorganic peroxygen compounds referred to above, which are preferably employed along with an activator. Some typical activators are amines, meta-bisulfites, ascorbic acid, Fe salts and many other activators which are well known to those skilled in the art.

SUMMARY OF THE INVENTION

It is an object of the instant invention to provide for a graft copolymer containing units of diacetoneacrylamide grafted onto a polyvinyl lactam substrate and optionally units of an acrylic acid ester grafted thereon.

It is another object of the instant invention to provide a method for producing such graft copolymers and stable aqueous emulsions containing same.

Other objects and advantages to appear hereinafter as the description proceeds.

Broadly speaking the invention includes the provision of a graft copolymer of a monomer mixture comprising approximately by weight 5 to 90 percent diacetoneacrylamide and 0 to 85 percent of an ester of acrylic or methacrylic and graft of polymerized on 10 to 35 percent of a polymeric N-vinyl lactam as substrate. The terpolymer may contain 1 to 50 percent of said ester when employed.

In carrying out the polymerization reaction, the catalyst and the mixture of side chain monomers to be grafted onto the substrate may be admixed with an aqueous solution of a previously activated polymeric (N-vinyl lactam) in any order, in increments or otherwise. For better temperature control and production of a product with optimum properties, it is, however, preferred to add the monomers gradually and/or in increments to the aqueous solution of polymeric (N-vinyl lactam) containing the activator and surfactant. In the embodiment of the invention where only the diacetoneacrylamide is grafted onto the poly(N-vinyl lactam) backbone the reaction should be carried out at temperatures of from about 30°C to about 100°C or more. In order to avoid violent and/or undesirable side-reactions, however, it is generally preferred to promote chemically induced grafting of the diacetoneacrylamide at about 70°C to about 90°C.

In the embodiment of the invention where both diacetoneacrylamide and an acrylic acid ester are grafted onto the polymeric N-vinyl lactam backbone, the reaction may be carried out at temperatures of −10°C to 180°c, however, in order to avoid the aforesaid side reactions, it is preferred to promote chemically induced graft copolymerization of both monomeric units onto the aforesaid substrate at about 30°to 100°C, most preferably at about 65°C to about 75°C. Either reaction is preferably carried out in the absence of oxygen, conveniently under a blanket of some inert gas, and at atmospheric pressure. The pH of the medium is substantially noncritical, though a Ph of about 3.0 to 8.0, preferably between 4.0 and 5.5 is preferred. Completion of the reaction is determined by cessation of evolution of heat and or spot analysis for residual monomer and the like.

The polymerization reaction is substantially quantitative in that an emulsion is produced containing the polymeric N-vinyl lactam-diacetoneacrylamide or polymeric N-vinyl lactam-diacetoneacrylamide-acrylate graft copolymer in the dispersed phase with little or no monomeric product dissolved in the continuous aqueous phase.

The ratio of polymeric N-vinyl lactam to diacetoneacrylamide can vary from 5:90 to 95:10 by weight, the ratio of polymeric (N-vinyl lactam) to diacetoneacrylamide-acrylate can vary from 10:95 to 95:10 by weight, while the ratio of acrylate can vary from 1:99 to 99:1. The amount of catalyst should be between 0.05 and 5.00 percent by weight, based on the total monomer content with a ratio of catalyst to activator of 0.5:1 to 5:1.

Some typical catalysts are persulfate salts, peroxides, alkali metal peroxides and other peroxy compounds. It is also possible to conduct the polymerization at between 50–50 percent solids content. The emulsion can be further concentrated, if desired, after the polymerization. The various surface active agents, protective colloids, plasticizers, chain transfer agents, or other additives can be added prior to, during or after the reaction is completed in accordance with techniques well known in the art.

The emulsions produced in accordance with this invention are characterized by unusually good stability, low to medium viscosity, generally below about 1,000 cps. (centipoises, Brookfield viscosometer), the ability to deposit a clear transparent film on a glass plate and a copolymer product which is essentially water insoluble and at least 90 percent soluble in N-methyl-2-pyrrolidone. This product may be characterized as a graft copolymer of diacetoneacrylamide on a polymeric N-vinyl lactam substrate or a graft copolymer of diacetoneacrylamide and an acrylic acid ester grafted onto a polymeric N-vinyl lactam substrate.

It will be understood that in carrying out the process of this invention, the known surface active agents and other ingredients mentioned hereinabove may be added prior to, during or after the polymerization reaction is completed. Anionic, nonionic or cationic emulsifying agents may be employed although anionic agents are preferred. As an example of nonionic agents which may be employed, there may be mentioned the condensation products of a plurality of moles ethylene oxide with organic compounds containing at least eight carbon atoms and a reactive hydrogen atom such as the water insoluble carboxylic and sulfonic acids, alcohols, phenols, thiols, hydroxcarboxylic acids, carboxy and sulfonic acid amides, primary and secondary amines, hydroxyalkyl amines, as dislcosed, for example, in U.S. Pat. Nos. 1,970,578; 2,205,021; 2,085,706; 2,002,613; 2,266,141; 2,677,700; 2,213,477; 2,593,112; 2,454,434; 2,454,542-545 and 2,174,761. As specific examples of such nonionic agents there may be mentioned the reaction products of one mole of nonylphenol with 9 to 100 E.O. (mole ethylene oxide); one mole of caster oil with 20 E.O.; one mole tall oil with 18 E.O.; one mole oleyl alcohol with 20 E.O.; one mole of dodecyl mercaptan with 9 E.O., one mole of soybean oil amine with 10 E.O.; one mole of rosin amine 32 E.O.; one mole of cocoanut fatty acid amine 7 E.O.; one mole of dinonyl phenol with 15 E.O., one mole of oxotridecyl alcohol 12 E.O.; Pluronic L62 and the like.

Suitable anionic surface active agents include the sulfonic acids, sulfate esters, and phosphate esters (particularly the primary and secondary phosphate esters and mixtures thereof) of the above mentioned nonionic surface active agents as disclosed, for example, in U.S. Pat. Nos. 3,004,056 and 3,004,057. Other such anionic surface active agents include alkylaryl sulfonic acids, such as, dodecylbenzone sulfonic acid, alkyl sulfates, such as, sodium lauryl sulfate, such as, sodium N-methyl tauride, taurides of higher ($C_{10-20}$) fatty acids as disclosed, for example, in U.S. Pat. Nos. 1,932,180; 3,013,035; 3,013,036; and 3,057,889, isethionates, such as, sodium N-methylisethionate, esters of higher ($C_{10-20}$) fatty acids, as disclosed for example, in U.S. Pat. Nos. 2,923,724 and 3,004,049.

Protective colloids and/or thickening agents may also be employed, if desired, such as, polyvinyl alcohol, copolymers, such as, the copolymer of vinyl methyl ether and maleic anhydride, hydroxy ethyl cellulose, carboxy methyl cellulose, natural gums and colloidal materials and the like. Viscosities of up to 100-5000 cps. or more may thereby be obtained when required.

The invention will be exemplified in more detail by means of the following examples which are not to be considered as limiting but as merely illustrative. All parts and proportions in the following examples as well as in the appended claims are by weight unless otherwise specified.

EXAMPLE I

Apparatus: 1 liter resin kettle equipped with mechanical stirrer, reflux condenser, thermometer, gas inlet tube and dropping funnel.

Procedure: Into the kettle there is charged 150 g. distilled water. 90 g. poly (vinylpyrrolidone) K-30 added, and the mixture stirred until the solution is clear. To this solution is added 2 g. sodium acetate, 4 g. "Aerosol OT" and 4 g. nonylphenoxypoly(ethyleneoxy)ethanol ("Igepal+CO-630).

110 g. diacetoneacrylamide is dissolved in 200 g. distilled water, and transferred to a dropping funnel.

The reaction vessel is purged thoroughly with nitrogen and the temperature raised to 60°C. At this point 2 g. ammonium persulfate is added to the flask. The heating is continued and the temperature raised to 100°C. This temperature is maintained for 30 minutes, after which the system is cooled to 80°C. and at this temperature the addition of the diacetoneacrylamide solution is started. 90 g. of the solution is added over 30 minutes. The mixture is allowed to react for an additional 15 minutes, then 5 g. of a 5 percent ammonium persulfate solution is added. Fifteen minutes later the addition is resumed and 100 g. diacetoneacrylamide solution is added in 30 minutes. After 15 minutes are allowed to consume the monomer, the catalyst addition (5 g.) is repeated. The exotherm reaction (peak at about 84°C.) is controlled by cooling and the reaction is continued at 80°C. Fifteen minutes after the catalyst addition, the final portion of the monomer (120 g.) is introduced gradually over 30 minutes, then 5 g. of 5 percent ammonium persulfate solution is added. The reaction is continued for another 30 minutes, after which the system is cooled to room termperature, and the white, milky latex discharged through a cheese cloth.

EXAMPLE II 600 g. distilled water is placed in a resin kettle. 160 g. PVP/K-30, 20 g. "Igepal" CO-630 and 2 g. sodium acetate are added and the mixture is stirred until the solution is clear. The system is purged with nitrogen, then heating is started. At 60°C. 2 g. ammonium persulfate is added. Heating is continued up to 100°C. which is maintained for 30 minutes.

Thereafter the addition of a mixture of 200 g. butylacrylate and 40 g. diacetoneacrylamide is started immediately. After 10 minutes the temperature is lowered to 88°–90°C., which is maintained during the rest of the procedure. The addition of the monomer is done in 2 hours. After that the mixture is stirred for 1 hour, then 0.2 g. ammonium persulfate is added. The temperature is kept for 20 more hours, then it is lowered to 25°C., and the product — milky, white latex is discharged through cheesecloth.

EXAMPLE III 528 g. distilled water is charged into a resin kettle, 96 g. PVP/K-30, 6 g. "Igepal"CO-630 and 2 g. sodium acetate are added and the mixture is stirred until clear solution is obtained. The system is then purged thoroughly with nitrogen. The temperature is increased to 60°C., at which point 2.4 g. ammonium persulfate is added. The temperature is increased to 100°C., and is maintained for 30 minutes. Thereafter the system is cooled to 60°C.

165.6 g. butyl acrylate, 18.4 g. diacetone acrylamide and 2 g. "Igepal" CO-630 are thoroughly mixed, and the mixture placed in a dropping funnel. In another dropping funnel, a solution is placed containing 16 g. n-methylol acrylamide and 2 g. "Igepal" CO-630 dissolved in 76 g. distilled water.

Twentyfive percent of these monomer-surfactant mixtures are added simultaneously to the contents of the kettle, and the temperature raised to 70°C., and held for 30 minutes. At this point 2 g. of a 5 percent ammonium persulfate is introduced, and the mixture maintained at 70°C. for an additional 30 minutes. Thereafter the addition of the rest of the monomers is started, and they are added in a continuous fashion from both dropping funnels simultaneously. The addition is complete in 2 hours. Thereafter the mixture is maintained at 70°C. for an additional 60 minutes.

The resulting product — milky, white latex - contains three different functional groups: carbonyl, amide and methylol functionalities.

EXAMPLE IV 600 g. distilled water is placed in a resin kettle. 160 g. PVP/K-30, 20 g. "Igepal" CO-630 and 2 g. sodium acetate are added and the mixture stirred until clear. The system is then purged with nitrogen, heated to 60°C. at which point 2 g. ammonium persulfate are added.

In a separate container, a uniform mixture is made consisting of 195.2 g. ethylacrylate, 22.8 diacetone acrylamide, 12 g. glycidyl methacrylate and 8 g. "Igepal" CO-630.

Of this mixture 59.5 g. are added to the contents of the resin kettle, and the mixture heated to 70°C. and maintained for 30 minutes. Thereafter 4 g. of a 5 percent ammonium persulfate solution is added and the system held at 70°C. for another 30 minutes. The addition of the rest of the monomers are then started and added in a continuous fashion over 2 hours. The mixture is allowed to react for 2 hours, cooled to room temperature, and charged through cheesecloth.

The product — milky, white latex — contains carbonyl, amide and epoxy functional groups.

EXAMPLE V 100 g. sample of the polymer described in Example II was mixed thoroughly with 5.0 g. ethanolamine.

Similar composition was made by mixing 5.0 g. ethanolamine with "Polectron" 530 (70 parts butylacrylate grafted onto 30 parts of PVP).

Films were cast from both latices on glass plates using a 0.003 size doctor's knife. The films were placed in a preheated oven at 150°C. and the plates were kept in the oven for 15 minutes. After that the plates were removed from the oven and were cooled to room temperature. Then the films were submitted to wet rubbing with water. The film case from "Polectron" 530 showed evidence of remoistenability, and soon lost its contact with the glass. After 30 rubbings, the film cast from the latex made according to Example II, did not show remoistenability, neither did it lose its bond after 100 rubbings.

Other variations and modifications of the described invention will be obvious to those skilled in the art and can be made in this invention without departing from the scope or spirit thereof.

Having thus described our invention, what we claim as new and novel, and desire to be secured by Letters Patent, is as follows:

We claim:

1. A graft copolymer of a monomer mixture comprising approximately by weight 5 to 90 percent diacetoneacrylamide and 0 to 85 percent of an ester of acrylic or methacrylic acid graft polymerized on 10 to 95 percent of polymeric N-vinyl lactam as substrate.

2. A graft copolymer as defined in claim 1 wherein said monomer mixture contains 1 to 50 percent of said ester.

3. A graft copolymer as defined in claim 2 wherein said ester is a $C_{1-6}$ alkyl ester.

4. A graft copolymer as defined in claim 2 wherein said ester is a substituted aliphatic ester.

5. A graft copolymer as defined in claim 3 wherein said ester is ethyl acrylate or butyl acrylate.

6. A graft copolymer as defined in claim 5 also containing glycidyl methacrylate.

7. A stable aqueous emulsion containing a graft copolymer as defined in claim 1.

8. A process for producing the stable aqueous emulsion as defined in claim 7 comprising subjecting an aqueous dispersion of said monomer mixture and polymeric N-vinyl lactam to polymerization conditions in the presence of a water soluble emulsifying agent and a free radical supplying polymerization catalyst.

9. A process as defined in claim 8 wherein said catalyst is ammonium persulfate and said emulsifying agent is selected from the group consisting of nonionic and anionic agents.

10. A process as defined in claim 8 wherein said polymerization is carried out at a temperature of about 30°C. to about 100°C.

11. A process for producing a graft copolymer as defined in claim 1 comprising carrying out the process as defined in claim 8 followed by the additional step of separating from the resulting emulsion the graft copolymer contained therein.

* * * * *